US011351972B2

United States Patent
Herden et al.

(10) Patent No.: US 11,351,972 B2
(45) Date of Patent: Jun. 7, 2022

(54) METHOD FOR CONTROLLING OR REGULATING A BRAKE SYSTEM AND BRAKE SYSTEM

(71) Applicant: KNORR-BREMSE SYSTEME FÜR SCHIENENFAHRZEUGE GMBH, Munich (DE)

(72) Inventors: Marc-Oliver Herden, Munich (DE); Marcus Fischer, Munich (DE); Roland Voigtländer-Tetzner, Vaterstetten (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 0 days.

(21) Appl. No.: 15/779,441

(22) PCT Filed: Nov. 21, 2016

(86) PCT No.: PCT/EP2016/078329
§ 371 (c)(1),
(2) Date: May 25, 2018

(87) PCT Pub. No.: WO2017/089305
PCT Pub. Date: Jun. 1, 2017

(65) Prior Publication Data
US 2018/0257623 A1    Sep. 13, 2018

(30) Foreign Application Priority Data
Nov. 25, 2015    (DE) .......................... 102015120439.8

(51) Int. Cl.
*B60T 13/66* (2006.01)
*B60T 8/17* (2006.01)
(Continued)

(52) U.S. Cl.
CPC .............. *B60T 13/665* (2013.01); *B60L 7/26* (2013.01); *B60T 7/126* (2013.01); *B60T 8/1705* (2013.01); *B60T 8/1893* (2013.01); *B60T 17/228* (2013.01)

(58) Field of Classification Search
CPC ...... B60T 13/665; B60T 7/126; B60T 8/1705; B60T 8/1893; B60T 17/228; B60L 7/26
See application file for complete search history.

(56) References Cited

U.S. PATENT DOCUMENTS

| 4,265,489 A | 5/1981 | Meinicke |
| 4,344,138 A * | 8/1982 | Frasier .................. B60T 8/1705 105/61 |

(Continued)

FOREIGN PATENT DOCUMENTS

| CN | 102548817 A | 7/2012 |
| CN | 102596670 A | 7/2012 |

(Continued)

OTHER PUBLICATIONS

Search Report and Written Opinion for International Patent Application No. PCT/EP2016/078829; dated Apr. 4, 2017.

(Continued)

*Primary Examiner* — Vishal R Sahni
(74) *Attorney, Agent, or Firm* — Barnes & Thornburg LLP

(57) ABSTRACT

The invention relates to a brake system of a rail vehicle having at least one pneumatic brake actuator, a pneumatic braking device for generating a brake pressure, an electro-pneumatic braking device for generating a brake pressure, and a controller. In the event of rapid, forcible, or emergency braking, the pneumatic braking device or the electro-pneumatic braking device provides a basic brake pressure, and the brake pressure is changed by the electro-pneumatic (Continued)

braking device, starting from the basic brake pressure provided, depending in particular on a load and/or a speed.

8 Claims, 2 Drawing Sheets

(51) Int. Cl.
    *B60L 7/26*     (2006.01)
    *B60T 17/22*     (2006.01)
    *B60T 7/12*     (2006.01)
    *B60T 8/18*     (2006.01)

(56) References Cited

U.S. PATENT DOCUMENTS

| | | | |
|---|---|---|---|
| 9,393,941 B2 | 7/2016 | Herden et al. | |
| 2013/0338860 A1* | 12/2013 | Herden | B61H 9/00 |
| | | | 701/20 |
| 2014/0217810 A1* | 8/2014 | Herden | B60T 8/1893 |
| | | | 303/132 |
| 2015/0134157 A1* | 5/2015 | Aurich | B60T 13/665 |
| | | | 701/20 |

FOREIGN PATENT DOCUMENTS

| | | |
|---|---|---|
| CN | 103582588 A | 2/2014 |
| CN | 103747991 A | 4/2014 |
| DE | 2801778 A1 | 7/1979 |
| DE | 4425789 A1 | 1/1996 |
| DE | 102009042965 A1 | 3/2011 |
| DE | 102009051019 A1 | 5/2011 |
| DE | 102011006002 A1 | 9/2012 |
| DE | 102011110047 A1 | 2/2013 |
| DE | 102013224421 A1 | 5/2015 |
| EP | 2626260 A1 | 8/2013 |
| JP | H1199942 A | 4/1999 |
| JP | 2012011984 A | 1/2012 |

OTHER PUBLICATIONS

Chinese Office Action corresponding to 201680079373.X, dated Apr. 20, 2020.

* cited by examiner

METHOD FOR CONTROLLING OR REGULATING A BRAKE SYSTEM AND BRAKE SYSTEM

APPLICATION CROSS-REFERENCE

This patent application is a U.S. National Phase of International Patent Application No. PCT/EP2016/078329, filed Nov. 21, 2016, which claims priority to German Patent Application No. 10 2015 120 439.8, filed Nov. 25, 2015, the disclosure of which being incorporated herein by reference in their entireties.

FIELD

Disclosed embodiments relate to a method for performing open-loop or closed-loop control of a brake system, in particular of a brake system of a rail vehicle, and to a brake system, in particular to a brake system of a rail vehicle. Furthermore, disclosed embodiments relate to a rail vehicle having at least one car which is equipped with such a brake system.

SUMMARY

Disclosed embodiments provide an improved method for performing open-loop/closed-loop control of a brake system and an improved brake system with which increased safety requirements can be complied with.

BRIEF DESCRIPTION OF THE FIGURES

Disclosed advantages, features and application possibilities of the disclosed embodiments can be understood better from the following description of an exemplary embodiment on the basis of the appended drawings, in which.

DETAILED DESCRIPTION

Figure 1:
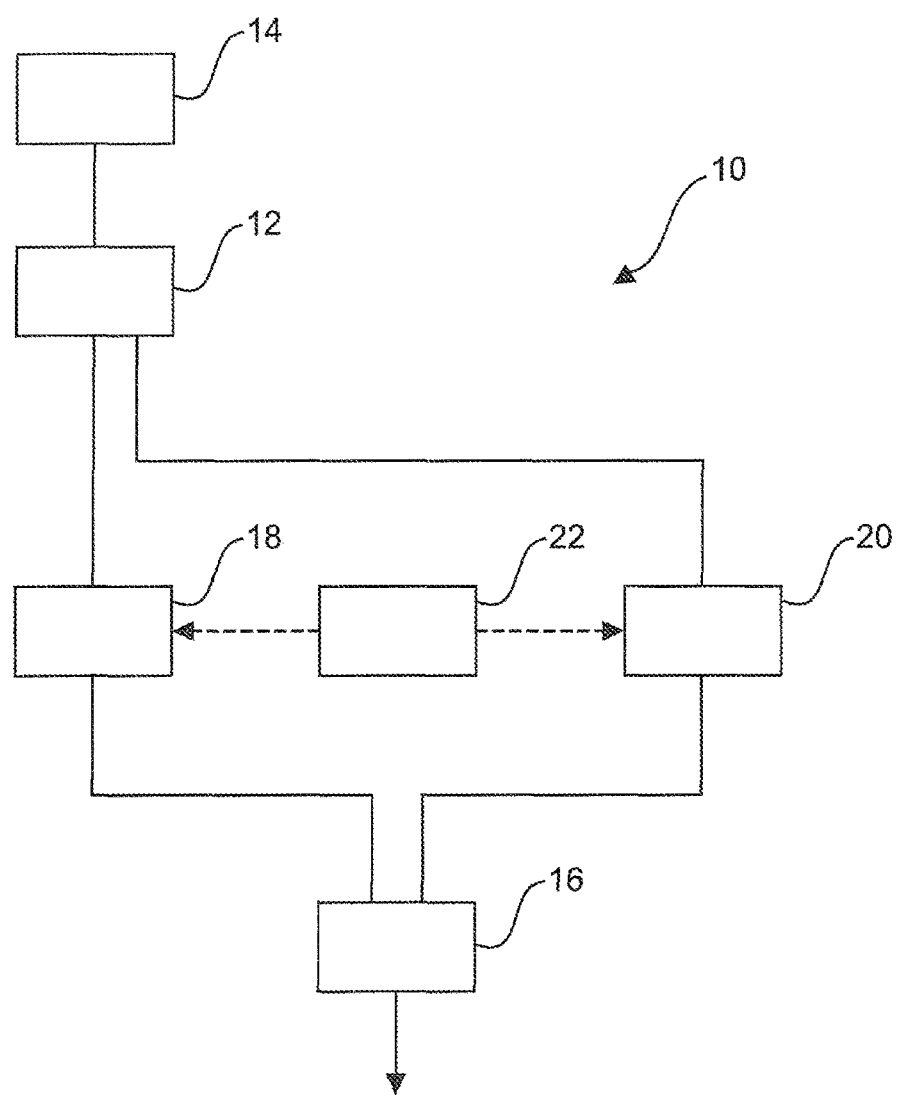
FIG. 1 shows a highly simplified diagram of a brake system of a rail vehicle according to an exemplary embodiment.

When approval of rail vehicles is carried out, checking of the brake system is generally also carried out according to national and international regulations. In this context, the braking capacity of the brake system is determined, inter alia, as what is referred to as a "braking weight". On the basis of the braking weight it is determined, for example, which route sections the rail vehicle can travel on at what maximum speed. In the SIRF safety guideline, the safety requirement level (SRL) 4 is determined, for example, for the calculable state of the "Generate braking force, braking at v>0" function for Germany. The safety requirement level constitutes a requirement for the reliability of the system depending on the hazard, wherein level 4 constitutes the highest safety level. At the European level, the safety requirement level for electrical/electronic systems according to standards such as EN 50129 or EN 61508 is also referred to as the safety integrity level (SIL). Currently, a SIL4 integrity level is not required for the rapid braking function of a brake system on a normative basis with respect to the accountability.

Rail vehicles are generally equipped with a plurality of brake systems which are used in the various braking positions. The brake systems include, in particular, compressed air brakes, aerodynamic brakes, electrodynamic brakes, retarder brakes in the case of diesel vehicles, magnetic rail brakes and eddy current brakes. The electropneumatic brake is used, for example, as an additional device for actuating the compressed air brake for simultaneous braking or release of all the brake actuators of a car of a rail vehicle or also of a plurality of cars or of all the cars of a rail vehicle. In the case of the compressed air brakes, a differentiation is additionally made between directly acting and indirectly acting brakes. The brake positions include, in particular, the passenger train brake P for lightweight to medium weight rail vehicles, the high-performance brake R for relatively high vehicle speeds, the goods train brake G for heavy and/or long rail vehicles, the additionally used magnetic rail brake R+MG or P+Mg for rapid braking operations, the additionally used eddy current brake R+WB for rapid braking operations, the additional electrodynamic brake P+E or R+E for motive power units. Furthermore, according to a widespread view the maximum permissible adhesion value between the wheel and the rail should not be exceeded in the case of all braking operations.

Rapid braking operations, which include all types of rapid braking, automatic train stops and emergency braking must be carried out with a high safety level. Such rapid braking operations are usually activated pneumatically by ventilating the main air line or are activated electrically by opening a safety loop; in addition, it is possible to differentiate between manual activation, for example, by the vehicle driver or a passenger and automatic activation by a safety system.

DE 10 2009 051 019 A1 describes an emergency brake device of a rail vehicle which is graduated in a speed-dependent fashion with a hierarchical sequence, wherein an emergency braking operation is carried out under braking force control and as a function of speed by means of a regenerative brake and/or an electropneumatic brake.

DE 10 2011 110 047 A1 describes an emergency brake device for a rail vehicle having an emergency brake control valve device for making available an emergency brake control pressure and an emergency brake setting device for setting the emergency brake control pressure which is made available, as a function of a load value and a speed value of the rail vehicle.

DE 10 2011 006 002 A1 proposes, for the purpose of increasing the braking distance safety under different operating conditions, equipping rail vehicles with a calculable deceleration-force-controlled friction brake system.

DE 10 2012 010 519 B3 describes a method for controlling a compressed air brake device of a rail vehicle which has a closed-loop electropneumatic brake device with brake pressure closed-loop control and a non-closed-loop brake pressure control device for generating a non-closed-loop-controlled brake pressure. In this method, in the case of rapid braking the closed-loop-controlled electropneumatic brake device and the non-closed-loop-controlled brake pressure control device are activated simultaneously and a brake pressure is applied to a pneumatic brake actuator as a function of a comparison of the brake pressures generated by the two brake devices.

Disclosed embodiments provide an improved method for performing open-loop/closed-loop control of a brake system and an improved brake system with which increased safety requirements can be complied with.

The method for performing open-loop or closed-loop control of a brake system which has at least one pneumatic brake actuator and one electropneumatic brake device for generating a brake pressure may be characterized in that in the case of rapid braking a pneumatic brake device or the electropneumatic brake device makes available a basic brake pressure, and the electropneumatic brake device changes the brake pressure as a function of a load and/or a speed, starting from the basic brake pressure which is made available.

The brake system according to a first aspect of the disclosed embodiments has at least one pneumatic brake actuator, one pneumatic brake device for generating a brake pressure, one electropneumatic brake device for generating a brake pressure and one controller, and is characterized in that the controller is designed to actuate the pneumatic brake device in the case of rapid braking, in such a way that the pneumatic brake device makes available a basic brake pressure; and the brake pressure which is generated by the pneumatic brake device can be changed as a function of a load and/or a speed by the electropneumatic brake device, starting from the basic brake pressure which is made available.

The brake system according to a second aspect of the disclosed embodiments has at least one pneumatic brake actuator, one electropneumatic brake device for generating a brake pressure and one controller, and is characterized in that the controller is designed to actuate the electropneumatic brake device in the case of rapid braking, in such a way that the electropneumatic brake device makes available a basic brake pressure; and the brake pressure which is generated by the electropneumatic brake device can be changed as a function of a load and/or a speed by the electropneumatic brake device, starting from the basic brake pressure which is made available.

According to the disclosed embodiments, it is proposed, in the case of rapid braking, to make available a basic brake pressure and to change the brake pressure by means of the electropneumatic brake device as a function of a load and/or a speed, optionally as a function of the load and speed, starting from this basic brake pressure. In this way, even in the case of rapid braking it is possible to carry out adaptation to reaching the target and/or to carry out adjustment of the braking distances. Furthermore, system-inherent fluctuations and tolerances can be compensated. In addition, it is possible to add for the electropneumatic brake device in the rapid braking, in particular to add for it in terms of braking weight.

In one advantageous refinement of the disclosed embodiments, the basic brake pressure is a minimum brake pressure. In this case, the brake pressure which is generated by the pneumatic brake device or the electropneumatic brake device is increased as a function of the load and/or the speed, starting from the basic brake pressure which is made available.

In another advantageous refinement of the disclosed embodiments, the basic brake pressure is a maximum brake pressure. In this case, the brake pressure which is generated by the pneumatic brake device or the electropneumatic brake device is reduced as a function of the load and/or the speed, starting from the basic brake pressure which is made available.

The brake pressure should, preferably, not undershoot a predefined lower limiting value during the rapid braking.

Disclosed embodiments can advantageously be applied in a rail vehicle having at least one car which is equipped with at least one pneumatic brake actuator, or in the case of a rail vehicle with a plurality of cars which are coupled to one another to form a vehicle trail, wherein each car has at least one pneumatic brake actuator.

The electropneumatic brake device may optionally be calculable in the case of rapid braking.

The functional safety of the rail vehicle may be further provided if the braking force of a maximum of M cars of a total of N cars fails. For example, the functional safety of the rail vehicle is given if the braking force of a maximum of one car of a total of four cars fails.

FIG. 1 shows a highly simplified diagram of an exemplary embodiment of a brake system having a compressed air brake device 10 of a rail vehicle.

The compressed air brake device 10 of the brake system has a main air container 12 in which the compressed air which is made available by a compressor 14 can be stored. The compressed air is fed to a pneumatic brake actuator 16 via a main air line. In the case of direct braking, the compressed air is made available to the brake actuator directly as a brake pressure, and in the case of an indirect brake the pressure of the main air line acts on a valve device in order to make available a brake pressure to the brake actuator, for example from an auxiliary pressure container.

In the embodiment in FIG. 1, the compressed air brake device 10 has a pneumatic brake device 18 and an electropneumatic brake device 20. Structures and methods of functioning of these two brake devices 18, 20 are basically known to a person skilled in the art, and a more detailed description can therefore be dispensed with here. Disclosed embodiments are also not restricted to any specific types of electropneumatic or pneumatic brake devices 18, 20.

The two brake devices 18, 20 are actuated by a controller 22 of the compressed air brake device 10. This controller 22 can be designed, for example, as a common controller for both brake devices 18, 20, or as two separate controllers, each for one of the two brake devices 18, 20. Furthermore, the controller 22 can be embodied separately from the brake devices 18, 20 or integrated therein, for example. In addition, the controller can be embodied in an electrical/electronic and pneumatic fashion.

Disclosed embodiments relate to the open-loop or closed-loop control of the brake system with this compressed air brake device 10 in the case of rapid braking, an automatic train stop or emergency braking (i.e., rapid braking according to the disclosed embodiments). The open-loop or closed-loop control of the brake system is not restricted for further operating situations, i.e., is basically random.

The open-loop or closed-loop control method according to disclosed embodiments for the brake system in the case of rapid braking will be explained in more detail with reference to FIGS. 2 and 3. Here, FIG. 2 illustrates the method according to the disclosed embodiments, while FIG. 3 shows, for the purpose of comparison, a conventional control method, in each case for a rail vehicle with four cars by way of example.

Figure 2:
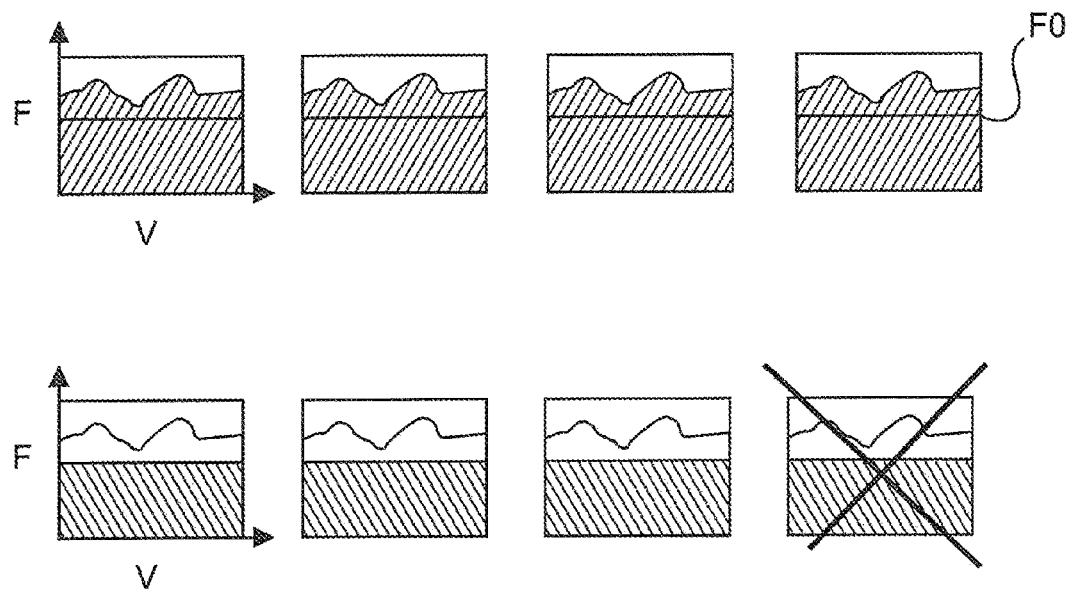
FIG. 2 shows a highly simplified diagram explaining the method for performing open-loop or closed-loop control of the brake system according to an exemplary embodiment.
Figure 3:
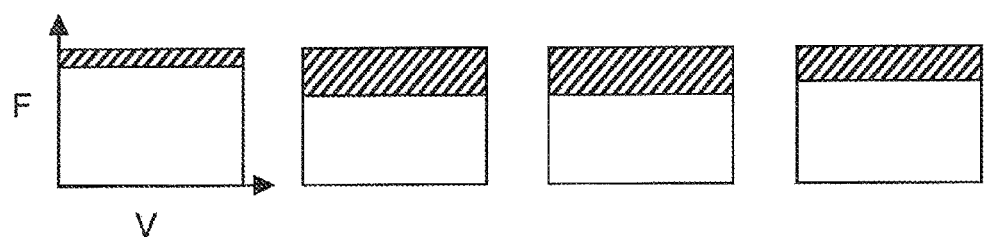
FIG. 3 shows a highly simplified diagram explaining a conventional method for performing open-loop or closed-loop control of a brake system.
Figure 3:
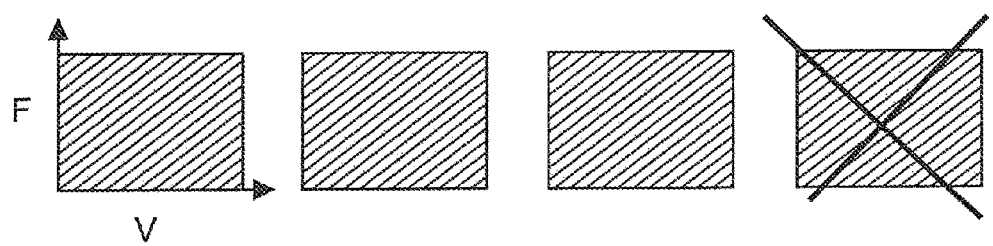

Each of the diagrams of FIG. 2 and FIG. 3 illustrate the brake pressure F plotted against the speed v of the rail vehicle. Here, the upper diagram respectively illustrates the accountability with respect to the braking weight in conjunction with the approval, while the lower diagram respectively illustrates the functional safety.

In conventional brake systems, in the case of rapid braking a pneumatic or electropneumatic brake device is activated, and when necessary assisted by an electrodynamic brake device, as shown in FIG. 3. The brake pressure F which is made available by the (electro)pneumatic brake device is as a rule calculable with different values for the different cars of the rail vehicle, with the result that the electrodynamic brake device also has to be calculated with different values, in order to achieve an essentially identical characteristic for the braking percentage Brh for each car.

With respect to the functional safety, it is conventionally required, for example, that the failure of the brake has to be possible, for example, for at maximum one of four cars (generally a maximum M of a total of N cars).

As illustrated in FIG. 2, in the method according to the disclosed embodiments for performing open-loop or closed-loop control of the brake system of the rail vehicle, in the case of rapid braking a basic brake pressure F0 for the brake actuator 16 is made available by the pneumatic brake device 18 (alternatively by the electropneumatic brake device 20). In the embodiment in FIG. 2, this basic brake pressure F0 is a minimum brake pressure which is at least as high as a predefined lower limiting value of the brake pressure which must not be undershot during the rapid braking of the rail vehicle.

The rapid braking is assisted by the electropneumatic brake device 20. In particular, the brake pressure F is increased by the electropneumatic brake device 20 as a function of a load and/or a speed v of the rail vehicle, starting from the basic brake pressure F0 which is made available.

As shown in FIG. 2, the resulting brake pressure F may be calculated for rapid braking with respect to the braking weight on the basis of basic brake pressure and increase in the brake pressure by means of the electropneumatic brake device 20.

In the disclosed control method, it is also optional, with respect to the functional safety, that the failure of the brake has to be possible for a maximum M of a total of N cars.

In another embodiment, the basic brake pressure F0 is a maximum brake pressure, and the brake pressure F is reduced by the electropneumatic brake device 20 as a function of a load and/or a speed v of the rail vehicle, starting from the basic brake pressure F0 which is made available. Here, the resulting brake pressure must not undershoot a predefined lower limiting value of the brake pressure.

LIST OF REFERENCE SYMBOLS

10 Compressed air brake device
12 Main air container
14 Compressor
16 Pneumatic brake actuator
18 Pneumatic brake device
20 Electropneumatic brake device
22 Controller
F Brake pressure, braking weight
F0 Basic brake pressure
v Speed

The invention claimed is:

1. A method for performing open-loop or closed-loop control of a rail vehicle brake system that has a pneumatic brake actuator, a pneumatic brake device, and an electropneumatic brake device, the method comprising:
   providing at the pneumatic brake actuator, a basic brake pressure for rapid braking by the pneumatic brake device; and
   augmenting the basic brake pressure at the pneumatic brake actuator, by a brake pressure generated by the electropneumatic brake device for rapid braking as a function of a load and/or a speed, starting from the basic brake pressure provided,
   wherein each of the pneumatic brake device and electropneumatic brake device are independently coupled directly to the pneumatic brake actuator.

2. The method of claim 1, wherein the rapid braking comprises automatic rail vehicle stopping or emergency braking.

3. The method of claim 1, wherein the basic brake pressure is a minimum brake pressure, and the augment in brake pressure is an increase in brake pressure as a function of the load and/or the speed, starting from the basic brake pressure made available.

4. A rail vehicle brake system comprising:
   a pneumatic brake actuator;
   a pneumatic brake device for generating a brake pressure and providing the brake pressure at the pneumatic brake actuator;
   an electropneumatic brake device for generating a second brake pressure and providing it at the pneumatic brake actuator; and
   a controller configured to actuate the pneumatic brake device and the electropneumatic brake device for rapid braking such that the pneumatic brake device provides the brake pressure and the brake pressure generated by the pneumatic brake device is augmented as a function of a load and/or a speed by the electropneumatic brake device starting from the brake pressure provided,
   wherein each of the pneumatic brake device and electropneumatic brake device are independently and directly coupled to the pneumatic actuator.

5. A rail vehicle having at least one car which is equipped with at least one pneumatic brake actuator and including the brake system of claim 4.

6. A rail vehicle having at least one car which is equipped with a brake system as claimed in claim 4.

7. The rail vehicle of claim 6, wherein the electropneumatic brake device is configured to calculate a resulting brake pressure for rapid braking.

8. The rail vehicle brake system of claim 4, wherein the rapid braking comprises automatic rail vehicle stopping or emergency braking.

* * * * *